United States Patent [19]

Sargent et al.

[11] Patent Number: 5,296,655

[45] Date of Patent: Mar. 22, 1994

[54] CONTROL SYSTEM FOR MULTIPLE INPUT SCALES

[75] Inventors: Michael P. Sargent; Timothy W. Williams, both of Huntsville, Ala.

[73] Assignee: Beowulf Corporation, Huntsville, Ala.

[21] Appl. No.: 833,056

[22] Filed: Feb. 10, 1992

[51] Int. Cl.⁵ .............................. G01G 19/00
[52] U.S. Cl. ................................. 177/199
[58] Field of Search ......................... 177/199

[56] References Cited

U.S. PATENT DOCUMENTS 4,502,555  3/1985  Gower ................. 177/199 X
4,969,112  11/1990  Castle ............... 177/25.13 X Primary Examiner—George H. Miller, Jr.
Attorney, Agent, or Firm—John C. Garvin, Jr.; James E. Staudt

[57] ABSTRACT

The disclosed invention is a control system for the systematic testing, calibration, and operation of weighting apparatus having multiple inputs. The invention also provides a fault alarm.

The system utilizes a summing network of resistors and switches to isolate and test or calibrate selected load cells controlled by the system Additionally, the summing network and the isolation switches of the control system provide a means for continued operation of defective scales having substantially equal load inputs. This is accomplished by electrically isolating those load cells which have become defective.

1 Claim, 3 Drawing Sheets

CONTROL SYSTEM FOR MULTIPLE INPUT SCALES

BACKGROUND OF THE INVENTION

1. Field of the Invention

This invention relates to a control system for the testing, calibration and enhanced operation of industrial scales having multiple weight inputs.

2. Description of Related Art

Multiple input electronic scales have three basic elements; multiple load cells, a device referred to in the industry as a junction box, and a weight indicator. In its most simple form a load cell is constructed by sandwiching an electrical type strain gage between layers of rigid material. As weight is applied to the layers, current flow through the electrical strain gage varies in response to the amount of weight applied. A junction box receives input signals from the multiple load cells, sums and averages the signals and transmits the averaged signal to the weight indicator. The weight indicator receives the averaged signal from the junction box and electrically converts the signal to a readable form indicating the weight being applied to the scale.

More specifically, load cells are precision machined metallic devices which will deflect under load and return to normal state when unloaded. The normal rating of signal output on a load cell is stated as a millivolt signal, most typically 2 or 3 millivolts per volt of excitation. Typically excitation is 10 volts D.C. Therefore, a 3 millivolts per volt of excitation load cell being powered by a 10 volt D.C. power supply will output a 30 millivolt signal when loaded to its full rated capacity. For example, a load cell having a 1000 pound capacity will output 3 millivolts per volt of excitation or 30 millivolts of signal when loaded 100 percent, i.e., 1000 pounds. Likewise, the millivolt signal will be 15 millivolts at 500 pounds. The output is both proportional and linear to the weight applied to the scale.

When multiple load cells are used, for example, under the four legs of a tank, the voltage signals are summed in a junction box located at the base of the tank. The junction box is located in close proximity to the load cells to minimize the lengths of the cables connecting the load cells to the junction box. This is done in part because the cable is quite expensive. More importantly, a considerable loss of signal is experienced as the length of the cables increase. Any signal loss greatly reduces the accuracy of the scale system.

A typical prior art junction box distributes a 10 volt excitation power to each of the load cells. The excitation power is provided by a power supply which is often a part of the scale display. The junction box receives a signal output from each load cell. Through the application of electrical resistors, it sums and averages the signals. The averaged signal is then transmitted to the weight indicator. It will be readily appreciated that accurate calibration of each load cell is of utmost importance, because the resultant average analog signal is fed directly to the weight indicator.

Thus, in a properly calibrated four input system having four 1000 pound load cells at full capacity, each load cell would output a 30 millivolt signal. The junction box would receive, sum, and average the signals and would output the resultant average voltage. This average voltage would result from the 30 millivolt output from each load cell multiplied by 4 load cells for a total output of 120 millivolts which would be divided by 4, again the number of load cells, for a resultant average of 30 millivolts. This 30 millivolt signal would then be transmitted to the digital weight indicator which would be calibrated to read 4000 pounds with an input of 30 millivolts.

To illustrate the effect of a defective or uncalibrated load cell, let us assume that one cell failed completely. In this case the total input to the junction box would fall from 120 to 90 millivolts which when averaged by the number of load cells (4) results in an average of 22.5 rather than 30 millivolts. The 22.5 millivolts when transmitted to the digital weight indicator will result in a reading of 3000 pounds rather than the actual weight of 4000 pounds, a resultant error of 25 percent.

Once the load cell signals have been summed, a digital indicator cannot indicate that one or more load cells have failed or drifted out of calibration and that the displayed weight is incorrect. As indicated in the example set forth above, digital type indicators which are universally used, are calibrated over a range of zero to full span capacity. The primary function of the indicator is to convert from an analog millivolt signal to a scaled digital display shown as units of weight. Some digital indicators have the capability to detect a significant zero shift, but only when the weight vessel returns to a true zero.

The calibration of such prior art scales is quite involved For example, tanks and hopper scales, because of their size and design limitations, are extremely difficult to calibrate precisely during initial installation. Periodic recalibration or accuracy verification of such industrial type scales is even more costly, difficult and time consuming, because of the interruption of service and the requirement that the scales be unloaded. Therefore, a great many electronic scales are never retested for accuracy unless they fail completely. However, scales licensed by law must normally be tested at least once a year. In many applications, such as the weighing of explosives or other dangerous chemicals, frequent calibration is critical, since the average life expectancy of a load cell is only about six years. The major causes of load cell failure are shock loading, moisture, vibration, and heat. Moisture often enters a load cell through a cracked or deteriorated cable and shorts out the load cell.

Prior art scales of the type described above have no alarm means for notifying the user that a load cell has failed. Thus, without the knowledge of the scale operator a load cell may fail causing the digital indicator to be off by 25 percent. Accordingly, a scale which should be reading 100,000 pounds may be reading only 75,000 pounds and the scale operator would have no way of knowing that the scale was in error. It follows that the prior art devices provide no means for the scale user to quickly and easily verify the operability or calibration of the scale. In such prior art scales, operability or calibration tests require specialized electronic equipment not normally owned by scale users. Therefore, verification of an industrial scale's accuracy has been a procedure which could be accomplished only by scale specialist. Calibration verification of these scales is quite complicated, costly and time consuming. When possible calibration of industrial scales is done on weekends or other off-production times so as to minimize interference with production.

SUMMARY OF THE INVENTION

The present invention is a control system for the systematic testing, calibration, and operation of weighing apparatus having multiple inputs. The invention also provides a fault alarm.

Unlike prior art junction boxes as described above, the control system which is the subject invention, has the ability to electrically isolate and test or calibrate one or more selected load cells controlled by the system. Additionally, the control system provides a temporary means for continued operation of defective scales of certain types. The control system has the ability to isolate from the averaging process those load cells which have become defective. These operations do not require skilled technicians, and may be performed without taking the scale out of service.

As an illustration, let it be assumed that one load cell, of the exemplary tank weighing apparatus described above, is removed from the circuit of the scale system by operation of the control system. Rather than providing an incorrect 22.5 millivolt average utilizing an input from all four load cells, the unique control system will, by operation of a single switch, permit the averaging of only the remaining three 30 millivolt signals and thus provide a corrected 30 millivolt signal to the digital indicator. In this way the control system, with no physical changes to the weighing apparatus, is able to provide the appropriate signal to the weight indicator to result in the correct weight of 4000 pounds. This feature is obviously effective only on generally symmetrical scale systems wherein each load cell carries approximately the same weight. The tank scale is a typical example of such a symmetrical arrangement.

It is therefore an object of the present invention to obviate the above mentioned and other shortcomings of the prior art.

It is another object of the invention to provide a alarm system to warn a scale operator of failure of components in a scale system.

It is another object of the invention to simplify troubleshooting procedures of multiple input scale systems.

It is another object of the invention to provide a simulated spare cell for use in generally symmetrical multiple input scales.

It is another object of the invention to provide a means for adjusting the zero balance and span signal for individual load cells.

It is another object of the invention to provide a load weighing apparatus having a plurality of signal producing load cell means, a weight indicator means, and a control system for receiving signals from the load cells and for selectively processing and transmitting the signals to the indicator.

These and other objects of the present invention will become apparent to those skilled in the art, as the description proceeds.

DESCRIPTION OF PREFERRED EMBODIMENTS

Figure 1:
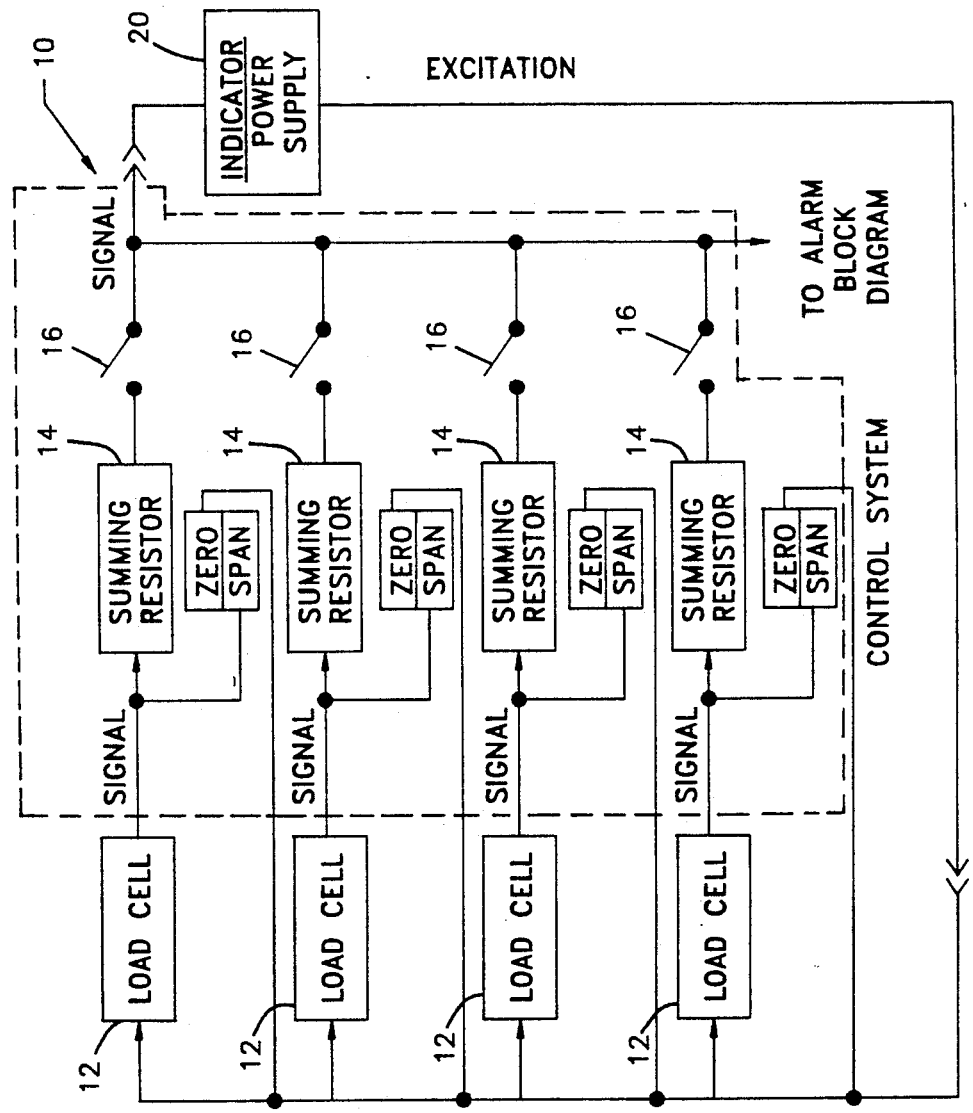
FIG. 1 is a block diagram illustrating the communication between the primary components of the control system and the components of a multiple input industrial scale.
Figure 2:
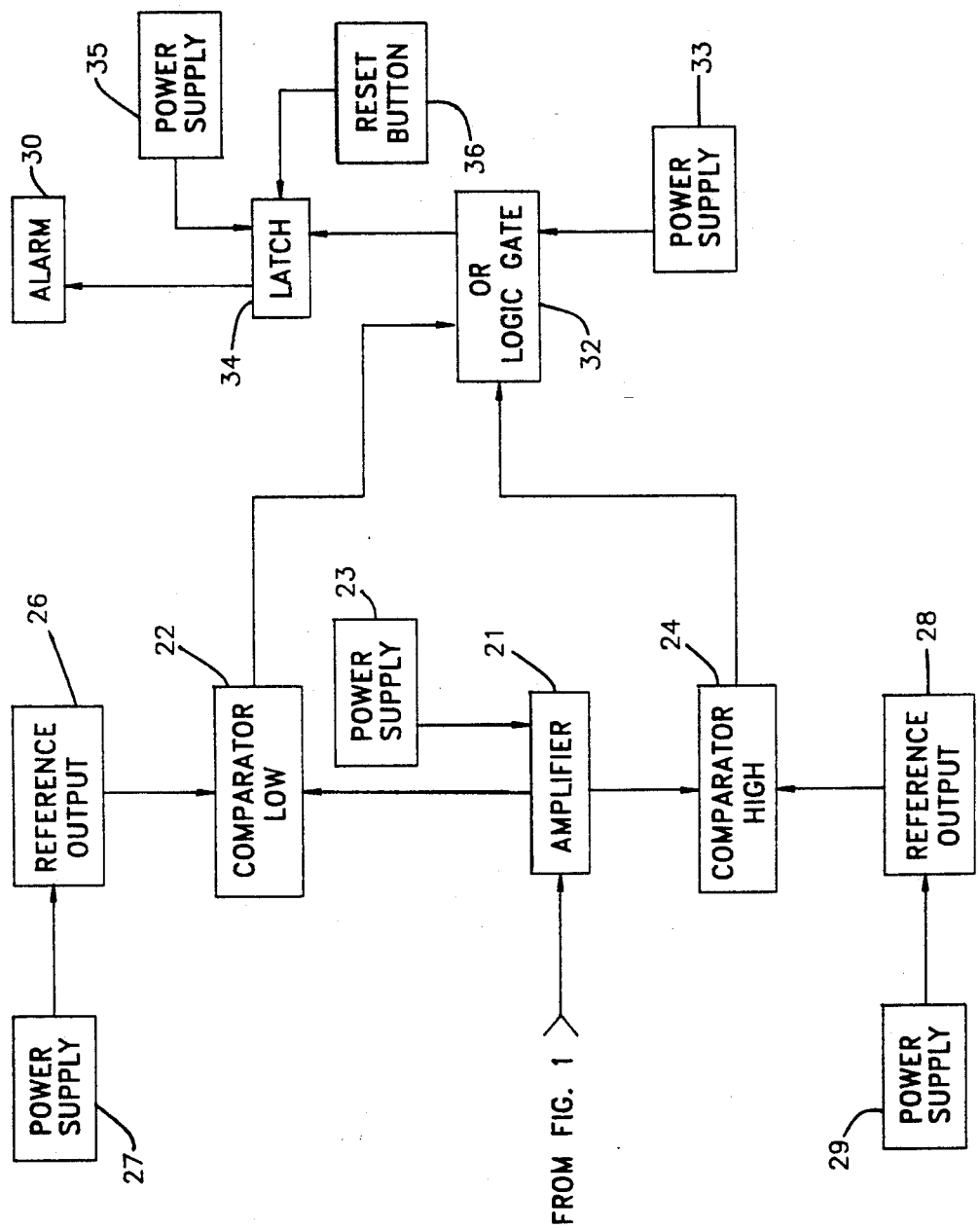
FIG. 2 is a block diagram illustrating the alarm portion of the control system.

Referring now to FIG. 1, the control system which is the subject of this invention is shown generally by the reference numeral 10. The control system 10 is connected to a group of four electronic weight measuring devices 12, which as pointed out above, are commonly referred to as load cells. It will be noted that the illustrated control system is arbitrarily configured to accommodate four load cells. However, the number of cells may be varied to accommodate the points of weigh applied to the scale being utilized. As is well known in the art, each of the load cells 12 provides an electrical output signal which varies proportionally and linearly in accordance with the weight which is applied thereto. As illustrated, signals from each load cell 12 are fed into summing resistors 14 which are normally connected to one another, through switches 16, in a parallel arrangement so as to form a summing network. Under normal operating conditions, this summing network totals and average the value of the load cells output signals. The output of the summing network is fed to a weight scale indicator 20. A power supply for excitation of the load cells is located within or adjacent the indicator. As illustrated in FIG. 1, the output of the summing network is also normally fed to an alarm circuit which is illustrated in FIG. 2. As illustrated in FIG. 2, this output of the summing network is initially fed to an amplifier 21, the power for which is supplied by power supply 23. After amplification, the output signals are passed to a pair of comparators 22 and 24. Within the comparators 22 and 24 the signals are compared to selected voltage references received from a pair of voltage reference outputs 26 and 28 respectively. The reference outputs 26 and 28 receive power from power supplies 27 and 29 respectively. The comparisons made by comparators 22 and 24 then determine whether an actuating signal will be fed to an alarm 30 through an "OR" logic gate 32 and a latch circuit 34. When a comparator produces no actuating signal it is said to be "inactive". Conversely when an actuating signal is produced by a comparator, the comparator is said to be "active". Accordingly, when both comparators 22, 24 are inactive then the alarm 30 via the latch 34 will be "off". If one or both comparators are "active" then the "OR" logic gate output will also be "active" and the alarm via the latch 34 will be "on". As illustrated the "OR" logic gate 32 and the latch circuit 34 receive actuating power from the power supplies 33 and 35 respectively.

The logic gate 32 treats the signals from the low comparator 22 and the high comparator 24 independently. If either of the high or low signals go beyond a predetermined range the logic gate will become "active" and will send a signal to the electronic latch 34 which causes the latch to actuate the alarm 30. When the signal actuates the latch 34 the latch electronically locks in a mode which continuously passes the actuation power to the alarm. This alarm sounding mode can only be changed by actuation of the reset and then only if the warning signal from the logic gate has stopped. Thus if the logic gate 32 is triggered by a spurious signal, the alarm may be disengaged by actuation of the reset. However, if the warning signal is continuous then the problem must be corrected in order to disengage the alarm.

Typically scale system failures are catastrophic in the sense that a short circuit or an open circuit will occur.

Failures of this type will normally cause the alarm circuit to be actuated immediately. It is to be understood that the alarm will sound only when the summed output voltage of the system exceeds either the high or low voltage limit as preset in the comparators. Thus, if a less serious failure or drifting occurs while the scale is partially loaded and the failure is not sufficient to drive the voltage beyond the limits of either of the comparators, the alarm would not sound. However, such a malfunction would cause the summed voltage to exceed the preset limits and sound the alarm whenever the scale is subjected to changing loads which would cause the voltage to exceed either the high or the low limits.

A key feature of the control systems is its capacity to isolate one or more load cells from the others. This feature is made possible by use of the isolation switches 16. Under normal operating conditions each switch 16 would remain in a closed position. In the event of failure of a load cell the alarm 30 would sound as explained above. Then by opening three of the four switches 16 the fourth load cell is isolated. The condition of the isolated cell may be ascertained by the reading of the indicator. If the cell is defective the indicator would show a reading other than the known reading of a good load cell. Thus, by the selective operation of the independent isolation switches 16, the defective cell may be identified by the process of elimination. Having identified the defective cell it may be effectively eliminated from the system by opening only the related switch 16. This operation takes the summing resistors of the defective cell out of parallel connection with the summing resistors of the remaining cells.

It is to be understood that switch isolation is a function of ohms law in that the isolation of one or more cells enables the control system to know by the change in resistance how many cells remain connected. For example, assume that four load cells are connected to the control system and that all four cells are turned on by switches 16. If each cell produces 3 millivolts per volt of excitation and excitation is 10 volts then, as previously explained, the summed output of the control system will be 30 millivolts. If one cell fails, the output would then be 22.5 millivolts.

To further illustrate the theory of operation of cell isolation, it will be noted that if all 4 isolation switches are on, that all four resistors are in parallel, and that if 3 isolation switches are on then 3 summing resistors are in parallel. As is well known, the effective resistance of resistors in a parallel circuit is the reciprocal of the total of the individual reciprocals of the resistors in the circuit. If each resistor is assumed to have a value of 1000 ohms it follows, therefore, that with one switch "on" the effective resistance would be 1000 ohms, if two switches were "on" the effective resistance would be 500 ohms, and so on. Further, in accordance with ohms laws the current flow with one switch "on" would be 100 percent, with two switches "on" it would be 200 percent, and so on. Thus, in accordance with Ohms Law the voltage output will stay 30 millivolts no matter how many cells are isolated assuming at least one cells is left on.

In this way it is understood that by simply opening a switch 16 which is connected to a defective cell, the averaging function performed by the summing network 14 many be altered to reflect the average voltage of only those cells which remain in the circuit, while ignoring those which have been isolated. This capability allows the system to provide an averaged signal which reflects the actual combined weight applied to the load cells while one or more of the load cells are defective. This procedure is, of course, only effective on scales which have approximately the same weight applied to each load cell. In addition, the isolation capability makes available several techniques for troubleshooting, testing and calibration which heretofore were not possible and which will be described in more detail hereinafter.

Figure 3:
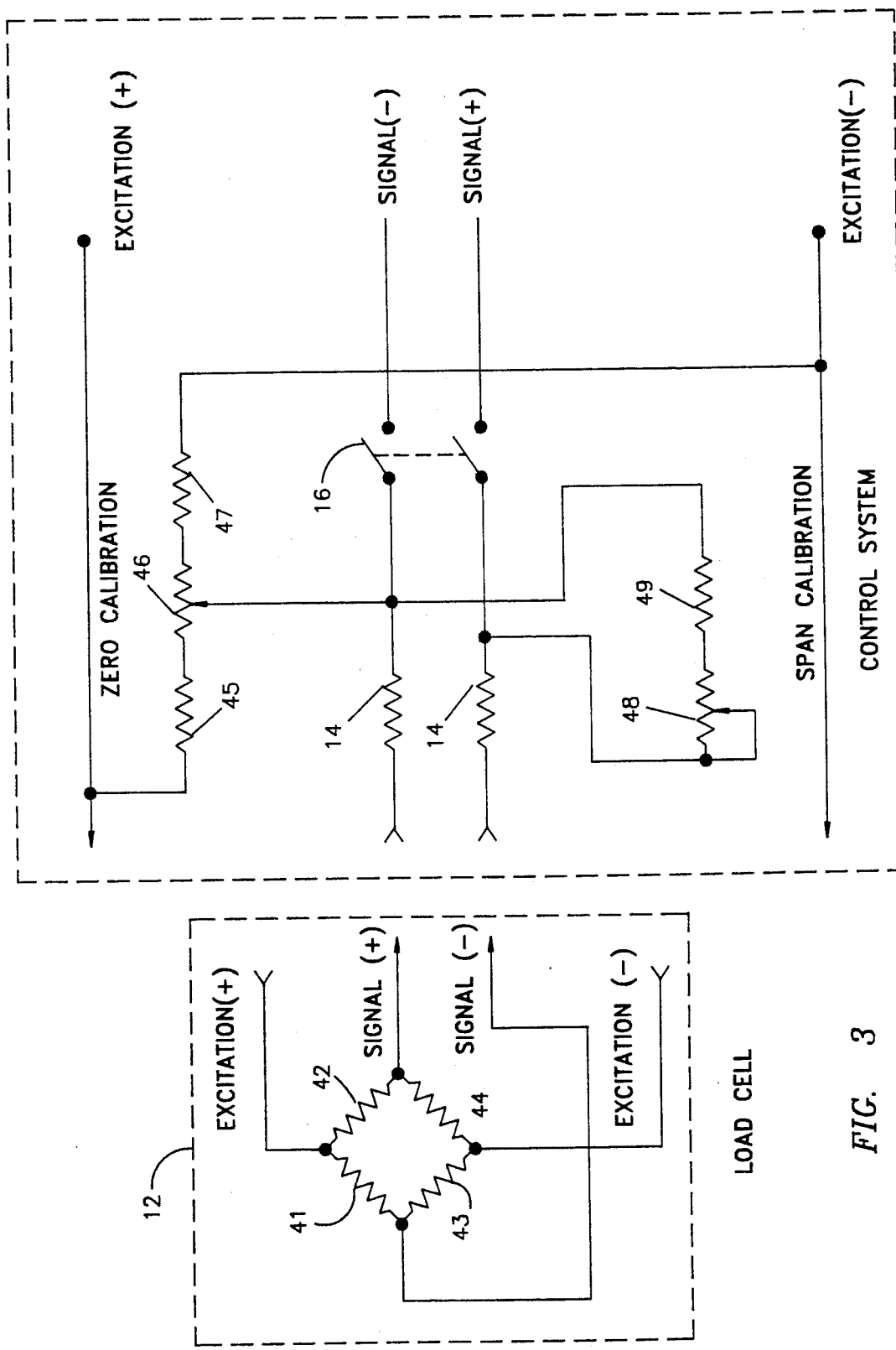
FIG. 3 is a circuit diagram of a portion of the control system which is dedicated to various adjustments which may be made by the control system.

Referring now to FIG. 3, a diagram of the circuits of a load cell, the summing resistors, a zero adjustment feature, a span adjustment feature, and the switch isolation feature is shown. By way of introduction of the two calibration operations made possible by this system, a brief description of the load cell circuitry is helpful. Accordingly, reference is made to FIG. 3 wherein it will be noted that the circuitry of the load cell forms a wheatstone bridge having resistors 41 through 44. It is pointed out that during standard operation of a load cell, as a load is applied the resistance of resistors 41 and 44 goes up while the resistance of resistors 42 and 43 goes down.

As shown in FIG. 3, the zeroing calibration is accomplished by three resistors 45, 46 and 47 which are connected in series between the (+) and (−) excitation lines, while the span feature is accomplished by a pair of resistors 48 and 49 which are connected in series between the (+) and (−) signal lines. Resistor 46 is of the variable type the tap line of which is connected to the (−) signal line. Resistor 48 is also of the variable type and has a tap line connected to one terminal of the resistor and to the (+) signal line. The double pole, double throw switch 16 corresponds to the switches 16 as illustrated in FIG. 1. The excitation and signal lines illustrated in FIG. 3 ar connected to like lines of other load cells as in the manner shown in FIG. 1, as is typical in the showing of lines of communication in a block diagram, the signal and excitation lines are illustrated as a single line which includes both the (+) and the (−) lines illustrated in the more detailed circuit diagram illustrated in FIG. 3.

Thus, in addition to the isolation capabilities described above, the control system permits the electrical calibration of the load cells. It will be noted a the explanation of the calibration capabilities of the system progresses, that the ability to isolate the load cells greatly enhances the utility of the calibration capabilities of the system. It should be further pointed out that the calibration operations are performed without the application of force o weight to the cell, as was heretofore required.

The control system employs a two step calibration procedure. The first step is referred to as the zero calibration. The zero calibration is, as the name implies, an adjustment of the scale indicator to a zero indication which reflects the simulated condition which would occur when only dead load has been applied to the scale. The second step is referred to as the span calibration. The span calibration relates to the accurate display of weight over the range of the scale up to full capacity. As indicated in FIG. 3, individual circuitry is provided for each of these calibration steps.

As previously pointed out, the zeroing circuit includes resistors 45, 46 and 47, arranged in series, wherein 46 is a variable resistor while 45 and 47 are fixed vale type resistors. The zero calibration is performed by adjusting the variable resistor 46 until a zero reading is displayed by the weight indicator. In accordance with Ohm's law concerning parallel circuits, the effect that adjustment of the variable resistor 46 has on resistors 41 and 43 allows the bridge circuit of the load cell to be rebalanced (recalibrated to 0 differential voltage), with deadload applied. Dead load is the weight applied to a scale by fixed items such as containers and supporting apparatus. Conversely, live load is the weight of the item which one desires to be weighed by the scale. By rebalancing the bridge, zero live load weight is equal to zero signal output. Therefore, valuable signal is not lost due to deadload. Thus, it is apparent that zeroing of the scale may be accomplished by adjusting the variable resistor 46 until the scale indicator reads zero.

The second calibration step is adjusting span. This adjustment assures that as weight is applied, the signal of the load cells will increase at the same rate. Accordingly, this adjustment is performed with at least a partial load applied to the scale. The weight of the applied load need not be known, however a weight of approximately one half the capacity of the scale is preferred. As pointed out above, and as illustrated in FIG. 3, it is reiterated that the span resistors 48 and 49 are arranged in series and that resistor 48 is variable resistor having its adjustment tap connected to the (+) signal line. In accordance with this circuitry, the theory of the span capability adjustment is as follows: assuming that I=-Signal Current, R=Resistance of resistor 48 plus the resistance of resistor 49, and Vout=Differential Voltage of SIG(+) and SIG(−); then it follows that Vout=I x R. If I goes up exponentially and R goes down proportionally, then the differential voltage of Vout will go down. Adjusting the variable resistor 48 causes R to go up or down, and therefore I goes up or down inversely. Also, Vout goes up and down with R. Thus, if Vout is adjusted, then the signal is adjusted because Vout is proportional to weight. Therefore, the span may be calibrated by adjustment of the variable resistor 48. Procedurally, this calibration is accomplished by sequentially isolating and adjusting each cell to the same reading after a considerable weight has been applied to the scale.

During calibration for zero (no load) or span (the range of the load cell), isolation "on" (wherein only one load cell is included in the circuit) is used. Each load cell is isolated "on" and the zero or span is set on the scale display in the selected weight units, typically, pounds or kilograms.

In operation of this control system, it will be appreciated that the unique calibration, isolation and alarm capabilities of the system cooperate with one another to provide a broad array of functions which theretofore were not available to the industry. For example, when utilizing the system for trouble shooting, either the indicator or the alarm or both may be used in conjunction with the isolation capability to identify a defective cell.

To aid in the understanding of the interaction of the system components, the basic capabilities of the system are listed, and are related to the various operational procedures in which each is used.

Switch isolation of load cells.
   Installation leveling.
   Single load cell calibration.
   Trouble shooting.
   Spare (simulated) load cell.
Zeroing calibration.
   Single load cell calibration.
   Elimination of signal loss.
   Cutting of load cell cables to desired lengths.
   Spare (simulated) load cell.
Span calibration.
   Single load cell calibration.
   Cutting of load cell cables to desired lengths.
   Spare (simulated) load cell.

To summarize a few salient points, the isolation of load cells is accomplished by manually switching off one load cell or by switching off all load cells but one. Therefore, a load cell may be isolated "off" or isolated "on".

Obviously, numerous modifications and variations of the present invention are possible in light of the above teachings. It is therefore to be understood that within the scope of the appended claims the invention may be practiced otherwise than as specifically described herein.

I claim:

1. In an electronic multiple input industrial load weighing apparatus having a load cell adapted to support the weight of each of said multiple inputs and to provide an output signal in response to the weight of said input, a power supply connected to each of said load cells, a control system for receiving and processing said output signals from each of said load cells and for transmitting processed signals to an indicator adapted to respond to said processed signals, said control system comprising:

means for selective isolation of one or more of said load cells whereby the output signal from any isolated cell is eliminated from said processing as well as from transmission to said indicator, and wherein said processing includes the summing and averaging of said output signals.

* * * * *